(12) United States Patent
Nassar (10) Patent No.: US 11,505,648 B2
(45) Date of Patent: Nov. 22, 2022

(54) FLUORINATED SURFACTANTS

(71) Applicant: RAN BIOTECHNOLOGIES, INC, Beverly, MA (US)

(72) Inventor: Roger A. Nassar, Swampscott, MA (US)

(73) Assignee: RAN Biotechnologies, Inc., Beverly, MA (US)

( * ) Notice: Subject to any disclaimer, the term of this patent is extended or adjusted under 35 U.S.C. 154(b) by 349 days.

(21) Appl. No.: 15/567,232

(22) PCT Filed: Apr. 20, 2016

(86) PCT No.: PCT/US2016/028399
§ 371 (c)(1),
(2) Date: Oct. 17, 2017

(87) PCT Pub. No.: WO2016/172183
PCT Pub. Date: Oct. 27, 2016

(65) Prior Publication Data
US 2018/0112036 A1  Apr. 26, 2018

Related U.S. Application Data

(60) Provisional application No. 62/150,409, filed on Apr. 21, 2015.

(51) Int. Cl.
| *C08G 65/334* | (2006.01) |
| *C08G 65/00*  | (2006.01) |
| *C08G 65/332* | (2006.01) |
| *C08G 65/337* | (2006.01) |
| *C08G 65/329* | (2006.01) |
| *C08G 65/333* | (2006.01) |

(52) U.S. Cl.
CPC ....... *C08G 65/3348* (2013.01); *C08G 65/007* (2013.01); *C08G 65/329* (2013.01); *C08G 65/337* (2013.01); *C08G 65/3322* (2013.01); *C08G 65/3328* (2013.01); *C08G 65/33303* (2013.01); *C08G 65/33317* (2013.01)

(58) Field of Classification Search
CPC ............................ A61K 9/1272; A61K 9/1641
See application file for complete search history.

(56) References Cited

U.S. PATENT DOCUMENTS

| 5,185,089 | A  | * | 2/1993  | Thomas ............... C10M 107/50 252/68 |
| 5,612,043 | A  |   | 3/1997  | Deprez et al. |
| 6,638,749 | B1 |   | 10/2003 | Beckman et al. |
| 2001/0031243 | A1 | * | 10/2001 | Unger .................. A61K 49/227 424/9.51 |
| 2002/0159952 | A1 | * | 10/2002 | Unger .................... A61K 9/127 424/9.51 |
| 2006/0002852 | A1 |   | 1/2006  | Saltzman et al. |
| 2006/0292555 | A1 |   | 12/2006 | Xu et al. |
| 2007/0141727 | A1 |   | 6/2007  | Huang et al. |
| 2008/0070274 | A1 |   | 3/2008  | Lee et al. |
| 2010/0015633 | A1 |   | 1/2010  | Lu et al. |
| 2010/0022414 | A1 | * | 1/2010  | Link ..................... B01F 3/0807 506/18 |
| 2010/0075314 | A1 |   | 3/2010  | Garimella et al. |
| 2010/0105112 | A1 |   | 4/2010  | Holtze et al. |
| 2011/0027854 | A1 |   | 2/2011  | Suda et al. |
| 2011/0117596 | A1 |   | 5/2011  | Mattiasson et al. |
| 2011/0165037 | A1 | * | 7/2011  | Ismagilov ......... B01L 3/502784 422/502 |
| 2012/0018382 | A1 |   | 1/2012  | Stein |
| 2012/0040905 | A1 |   | 2/2012  | Perret et al. |
| 2012/0114554 | A1 | * | 5/2012  | Desimone .................. B01J 2/22 424/1.11 |
| 2012/0264646 | A1 | * | 10/2012 | Link ..................... B01F 5/0646 506/11 |
| 2014/0072518 | A1 | * | 3/2014  | Cleek ...................... A61L 27/34 424/9.454 |
| 2014/0303005 | A1 | * | 10/2014 | Samuels ............ C12N 15/1075 506/2 |
| 2014/0349928 | A1 | * | 11/2014 | Nestor ................... A61K 38/26 514/6.7 |

FOREIGN PATENT DOCUMENTS

| EP | 0073611 A1    | 3/1983 |
| EP | 0230768 A1    | 8/1987 |
| WO | 2007095279 A2 | 8/2007 |
| WO | 2014151836 A1 | 9/2014 |

OTHER PUBLICATIONS

Mazutis and Griffiths, "Selective droplet coalescence using microfluidic systems", Lab on a Chip, 12:1800-1806 (Year: 2012).*
Holtze et al.,"Biocompatible surfactants for water-fluorocarbon emulsions", Lab on a Chip, 8: 1632-1639 (Year: 2008).*
Final Office Action received in U.S. Appl. No. 14/773,024 dated Jun. 23, 2017; 10 pages.
International Search Report and Written Opinion received in PCT/US2014/26540 dated Jul. 28, 2014; 11 pages.
International Preliminary Report on Patentability received in PCT/US2016/28399 dated Nov. 2, 2017; 6 pages.
International Search Report and Written Opinion received in PCT/US2016/28399 dated Jul. 26, 2016; 7 pages.
Kalahnikova et al., Development of a strategy of influenza virus separation based on pseudoaffinity chromatography on short monolithic columns, Analytical Chemistry 2008 80(6):2188-2198.
Li et al., Carboydrate-fuctionalized chitosan fiber for influenza virus capture, Biomacromolecules 2011 12 (11):3962-3969.

(Continued)

*Primary Examiner* — Anand U Desai
(74) *Attorney, Agent, or Firm* — Wolf, Greenfield & Sacks, P.C.

(57) ABSTRACT

The present disclosure provides amphiphilic fluorinated surfactant molecules for lowering the surface tension of aqueous, hydrocarbon, or solid phases in the presence of a fluorophilic continuous phase and for selectively interacting with biological and/or chemical molecules.

23 Claims, 5 Drawing Sheets

(56) References Cited

OTHER PUBLICATIONS

Medintz et al., Proteolytic activity monitored by fluorescence resonance energy transfer through quantum-dot-peptide conjugates. Nature Materials 2006 5: 581-589.

Nassar et al., Removing human immunodeficiency virus (HIV) from human blood using immobilized heparin Biotechnology Letters 2012 34 (5):853-856.

Non-Final Office Action received in U.S. Appl. No. 14/773,024 dated Feb. 15, 2017; 8 pages.

Non-Final Office Action received in U.S. Appl. No. 14/773,059 dated Nov. 8, 2016; 11 pages.

Pissuwan et al., Prospects for gold nanorod particles in diagnostic and therapeutic applications, Biotechnol Genet Eng Rev 2008 25: 93-112.

Rusnati et al., The Journal of Biological Chemistry, 1997, 272(17): 11313-11320.

Simons et al., "Monodisperse perfluorohexane emulsions for targeted ultrasound contrast imaging" Journal of Materials Chemistry. Mar. 12, 2010 (Mar. 12, 2010) vol. 20, p. 3918-3923.

Non-Final Office Action received in U.S. Appl. No. 14/773,024 dated Dec. 5, 2017; 10 pages.

English Translation of Second Office Action received in CN Application No. 201480014377.0 dated Oct. 30, 2017; 11 pages.

Naka, Definition of "Monomers, Oligomers, Polymers, and Macromolecules" from the Encyclopedia of Polymeric Nanomaterials [online]. Retrieved on Dec. 22, 2020. https://doi.org/10.1007/978-3-642-36199-9_237-1. Epub Sep. 24, 2014.

[No Author Listed], Figure 1. Working Towards a Global Emission Inventory of PFASS: Focus on PFCAS—Status Quo and the Way Forward Working Towards a Global Emission Inventory of PFASS: Focus on PFCAS—Status Quo and the Way Forward. Organisation for Economic Cooperation and Development. 2015;30:24-5.

\* cited by examiner

FLUORINATED SURFACTANTS

FIELD

The present disclosure is directed, in part, to manufacturing and using surfactants exhibiting dual actions: stabilizing the interface between a fluorophilic phase and a non-fluorophilic phase; and providing suitable active sites for facilitating biological and chemical activities within the involved phases.

BACKGROUND

Surfactant molecules in general are indispensable for stabilizing interfaces between immiscible phases. Of particular interest, emulsions comprised on one hand of an aqueous or lipophilic phase and on the other hand a hydrocarbon or fluorocarbon oil phase, require the use of surfactants. Since the main objective for surfactants has been to stabilize interfaces between phases, the focus in the molecular design of surfactants has been to render them chemically and biologically inert. However, new technologies have been emerging where functionalized surfactants are in need. Of particular interest are surfactants that interact in a selective manner with specific biological or chemicals. Such interactions can be, for examples, for labeling or catalysis purposes.

SUMMARY

In general, the present disclosure provides amphiphilic fluorinated surfactant molecules for lowering the surface tension of aqueous, hydrocarbon, or solid phases in the presence of a fluorophilic continuous phase and for selectively interacting with biological and/or chemical molecules. In some embodiments, the surfactant molecules include one or multiples of a fluorophilic group that is soluble in or has affinity to a fluorophilic continuous phase or a fluorophilic surface, and one or multiples of a headgroup that is soluble in or has affinity to an aqueous phase, a lipophilic phase, a solid surface, or combinations thereof, and that interacts in a specific mode, for examples physical or chemical, with biological or chemical entities present in any or all the aforementioned phases. Surfactants and combinations thereof of the invention may provide sufficient stabilization of interface between fluorophilic and non-fluorophilic phases and may provide suitable active sites for facilitating biological and chemical activities within the involved phases.

The present disclosure provides methods of manufacturing and using biologically and chemically active fluorinated surfactant molecules. The fluorinated surfactant molecules are formed by attaching one or multiple fluorophilic groups to one or multiple fluorophobic groups, where the fluorophilic groups or the fluorophobic groups or a combination thereof are designed or selected to have specific interactions with chemicals of biologicals. One method of use of such surfactant molecules is in emulsion of hydrocarbon oil or water droplets suspended in a fluorophilic oil. Another method of use of such surfactant molecules is at the interface of a fluorophilic phase and a fluorophobic phase. Another method of use of such surfactant molecules is to have a specific interaction with other chemical or biological molecules or formulations of both chemical and biological molecules. The nature, size and relative size of the fluorophilic and fluorophobic components can vary depending on the phases and setup in which the surfactant molecules are used.

In some embodiments, a method of use of such surfactant molecules is in emulsion of hydrocarbon oil or water droplets suspended in a fluorophilic oil.

In some embodiments, a method of use of such surfactant molecules is at the interface of a fluorophilic phase and a fluorophobic phase. Non-limiting examples of fluorophobic phase materials include water, methanol, ethanol, propanol, butanol, dimethyl sulfoxide, dimethylformamide, tetrahydrofuran, or combinations thereof. Non-limiting examples of fluorophilic phase materials include 3-ethoxy-dodecafluoro-2-trifluoromethyl-hexane, triperfluorobutylamine, perfluoromethyldiperfluorobutylamine, ethyl nonafluoroisobutyl ether, ethyl nonafluorobutyl ether, methyl nonafluorobutyl ether, perfluorinated oils, or combinations thereof.

In some embodiments, a method of use of such surfactant molecules is to have a specific interaction with other chemical or biological molecules or formulations of both chemical and biological molecules.

In some embodiments, the surfactant molecules are dissolved in the fluorophilic phase which is then mixed with a fluorophobic phase to form an emulsion. The formation of an emulsion can be in a non-controlled fashion using for example a shaker or an emulsifier. The formation of an emulsion can be in a controlled fashion using for example a microfluidic device.

In some embodiments, the surfactant molecules are dissolved in the fluorophobic phase which is then mixed with a fluorophilic phase to form an emulsion. The formation of an emulsion can be in a non-controlled fashion using for example a shaker or an emulsifier. The formation of an emulsion can be in a controlled fashion using for example a microfluidic device.

In some embodiments, the surfactant molecule is dissolved in the fluorophobic phase or in the fluorophilic phase and applied physically or covalently to a solid phase or surface.

BRIEF DESCRIPTION OF THE DRAWINGS

The appended drawings have been included herein so that the above-recited features, advantages and objects of the disclosure will become clear and can be understood in detail. These drawings form a part of the specification. It is to be noted, however, that the appended drawings illustrate suitable embodiments of the disclosure and should not be considered to limit the scope thereof.

DESCRIPTION OF EMBODIMENTS

Figure 1:
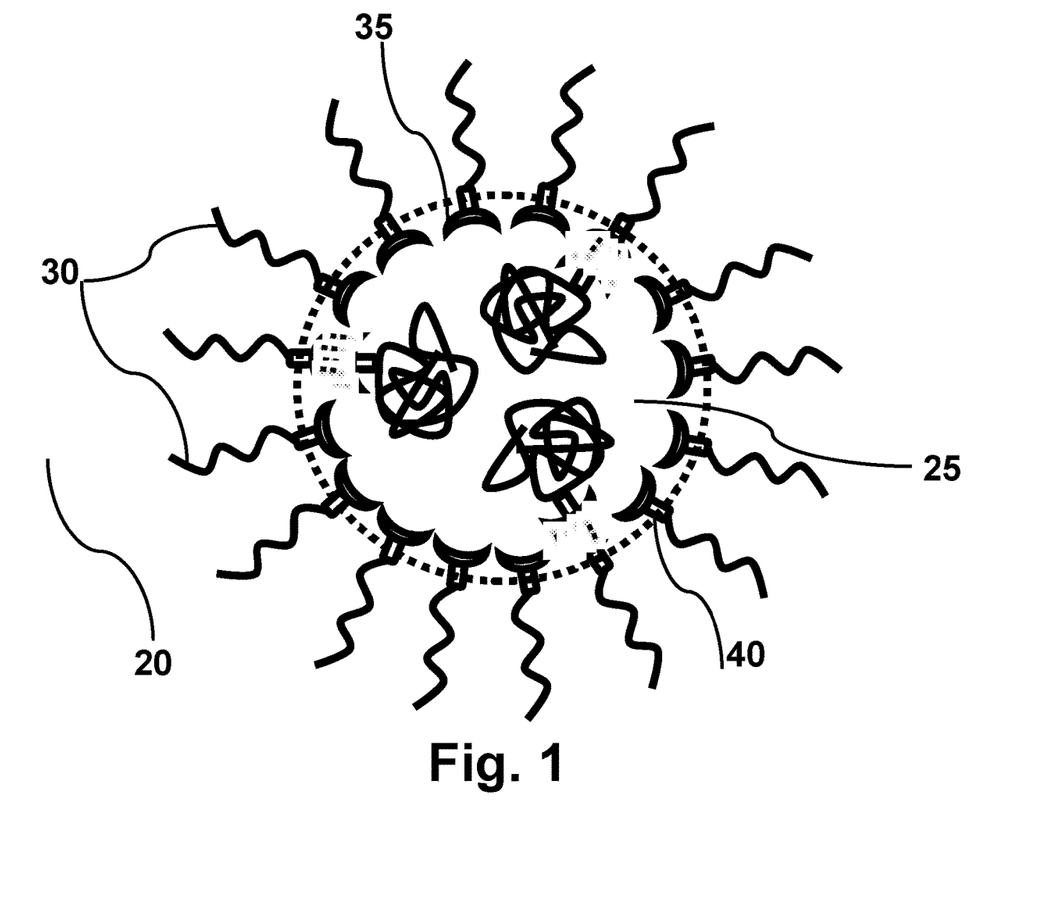
FIG. 1 illustrates surfactant molecules at the interface of immiscible phases, interacting with chemical or biological molecules.
Figures 2A, 2B:
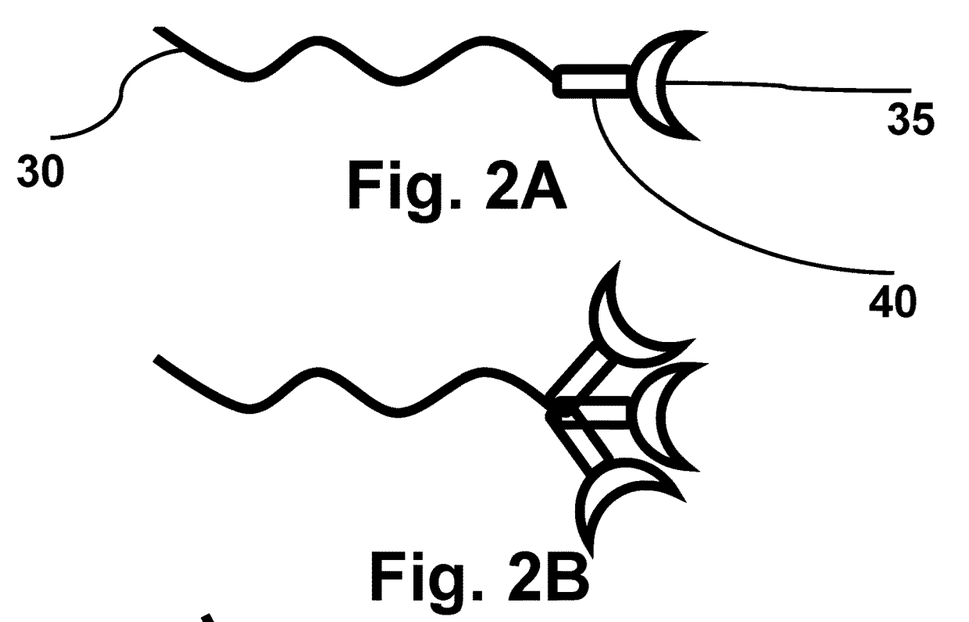
FIGS. 2A, 2B, and 2C illustrate three different embodiments, where the concentrations and ratios of the groups of atoms in the surfactant molecules vary.
Figure 2C:
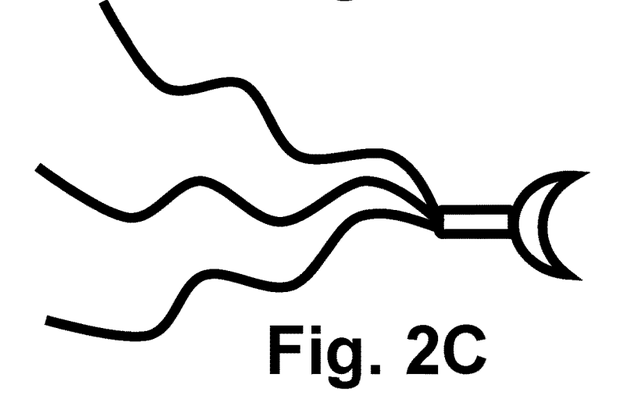

Surfactant molecules in general are designed to lower the surface tension between immiscible phases. They tend to occupy the interface between such phases, while being anchored to each phase via a group of atoms. For example, referring to FIG. 1, a surfactant molecule that is designed to lower the surface tension between oil, the continuous phase (20), and water, the discontinuous phase (25), is mainly composed of two groups of atoms: one group of atoms (30) is attracted to the oil phase, and the other group of atoms (35) is attracted to the water phase. The two groups of atoms are linked via a chemical linker (40). Various combinations of the two groups of atoms can exist. For a non-limiting example, one group of atoms that is attracted to the water phase can be bound to one group of atoms that is attracted to the oil phase (see, FIG. 2A). For another non-limiting example, multiple groups of atoms that are attracted to the water phase can be bound to one group of atoms that is attracted to the oil phase (see, FIG. 2B). For yet another non-limiting example, one group of atoms that is attracted to the water phase can be bound to multiple groups of atoms that are attracted to the oil phase (see, FIG. 2C).

Figure 3A:
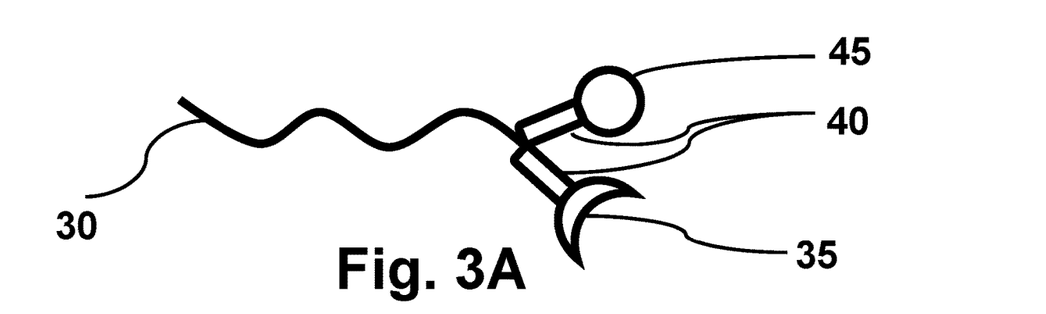
FIGS. 3A, 3B, and 3C illustrate examples of methods of attachment of groups of atoms within the presented surfactant molecules.
Figure 3B:
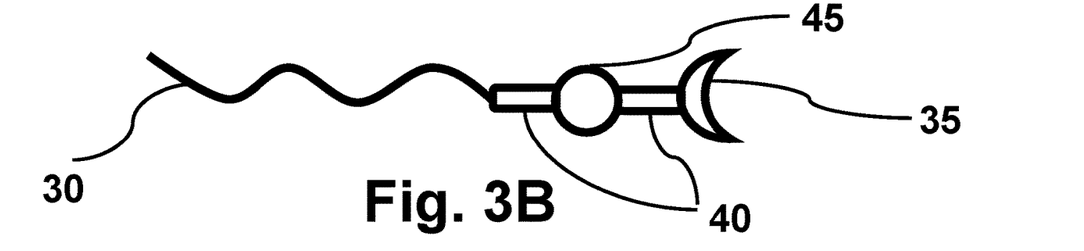
Figure 3C:
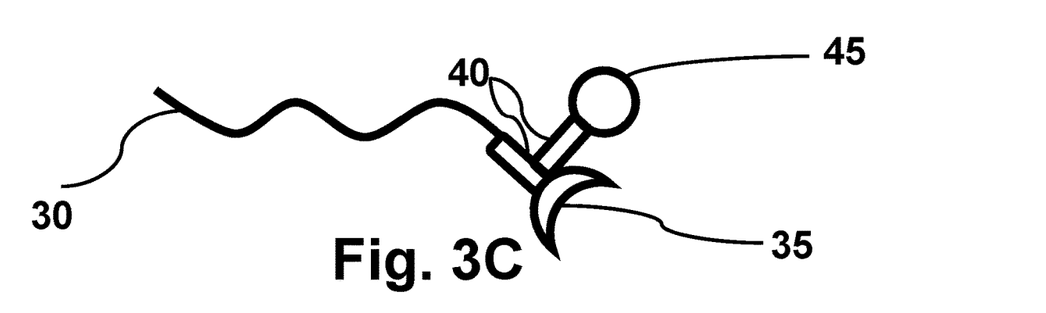

In addition to the above general description, the presented surfactant molecules are designed to exhibit a chemical or biological function. Such function could be part of the aforementioned two groups of atoms that anchor the surfactant molecules at the interface of immiscible phases. For non-limiting example, the hydrophilic group (35) in FIG. 1 has two functions: anchoring the surfactant molecule in the aqueous phase; and the other function is to interact with the ingredients of the aqueous phase. In some cases, a third group of atoms (45) (see, FIGS. 3A and 3B) is physically or chemically attached to the aforementioned two groups of atoms and can perform any or both functions of anchoring the surfactant in the aqueous phase and of interacting with the ingredients of the aqueous phase. Group (45) could be attached in various modes to the surfactant molecules. For non-limiting example, group (45) can be attached to the fluorophilic group (30), and where the linking groups (40) can be the same or different (see, FIG. 3A). Another non-limiting example, group (45) can be attached to both the fluorophilic group (30) and the fluorophobic group (35), and where the linking groups (40) can be the same or different (see, FIG. 3B). Yet another non-limiting example, group (45) can be attached to the fluorophobic group (35), and where the linking groups (40) can be the same or different (see, FIG. 3C).

A chemical or biological function can be attracting chemicals or biologicals to the interface, or catalyzing a reaction or reactions in one phase or in multiple phases. The presented surfactant molecules can also act as one of the reagents contributing to chemical reaction or reactions in one phase or in multiple phases.

Figure 4:
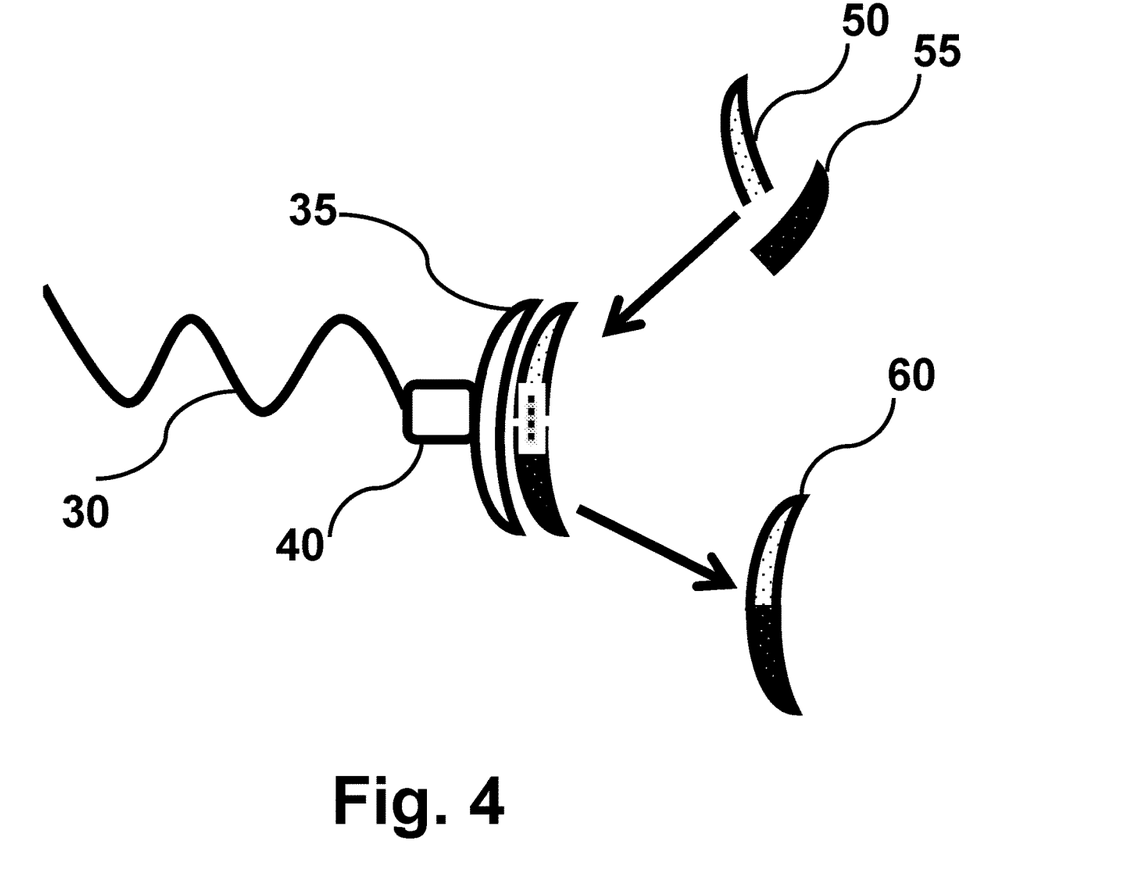
FIG. 4 illustrates example association reaction facilitated by the presented surfactant molecules.

A non-limiting example is where the functional group facilitates association reactions, combining chemically or physically multiple groups (for example, association of groups (50) and (55) in FIG. 4) into a single group (for example, group (60) in FIG. 4).

Figure 5:
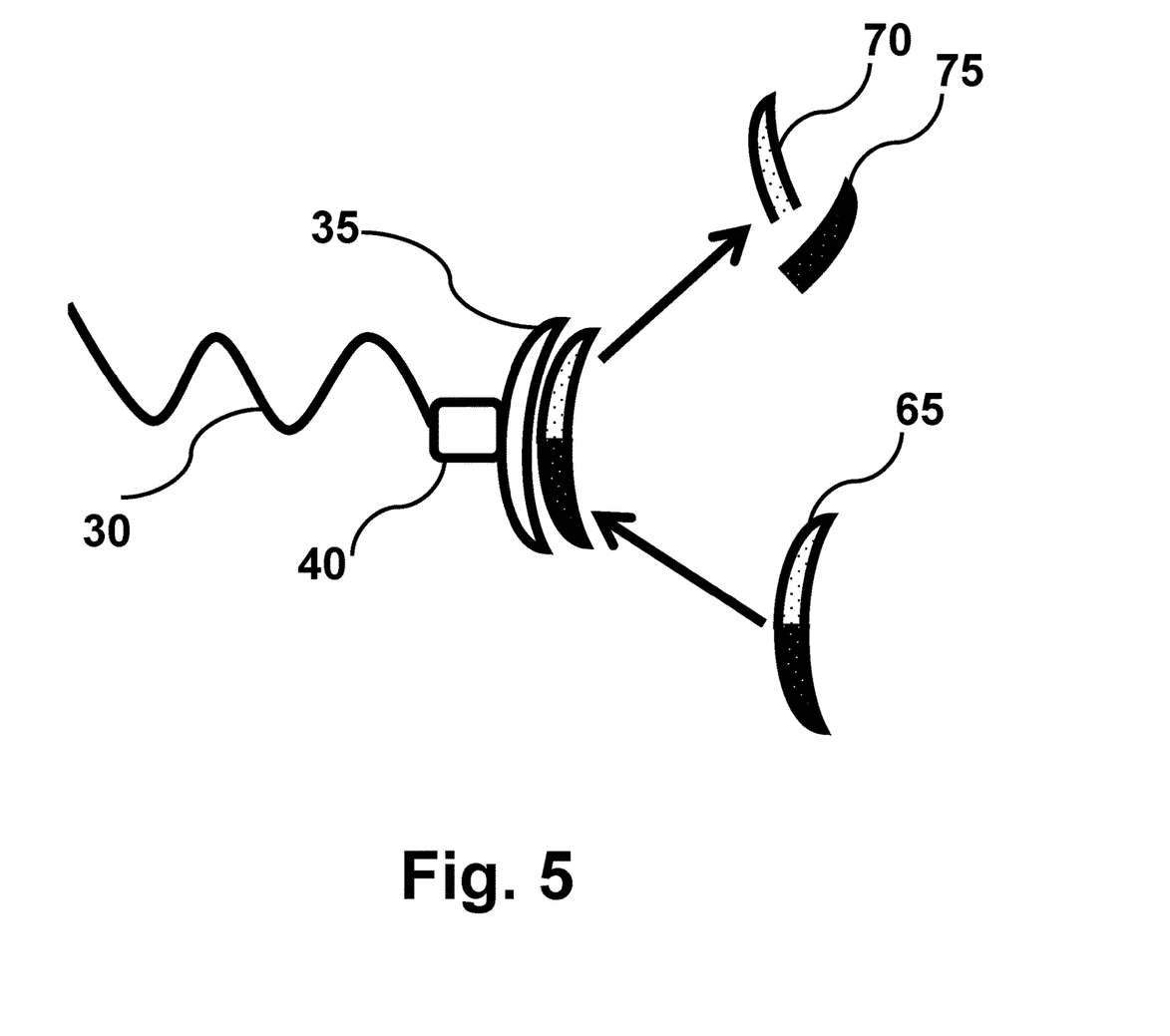
FIG. 5 illustrates example dissociation reaction facilitated by the presented surfactant molecules.

Another non-limiting example is where the functional group facilitates dissociation reactions, cleaving chemical or physical bonds between groups (see, FIG. 5).

A biological function can be interacting with biological entities, such as microorganisms and their components (such as deoxyribonucleic acid, ribonucleic acid, proteins, peptides, enzymes).

A "microorganism" (i.e., a microbe) as used herein can be a single cell or multicellular organism and includes organisms such as prokaryotes (e.g., bacteria and archaea), eukaryotes (e.g., protozoa, fungi, algae, microscopic plants and animals), and viruses. For example, the bacteria can be gram negative or gram positive. In specific embodiments, the microorganism is selected from *Staphylococcus aureus, Streptococcus, Escherichia coli* (*E. coli*), *Pseudomonas aeruginosa,* mycobacterium, adenovirus, rhinovirus, smallpox virus, influenza virus, herpes virus, human immunodeficiency virus (HIV), rabies, chikungunya, severe acute respiratory syndrome (SARS), malaria, dengue fever, tuberculosis, meningitis, typhoid fever, yellow fever, ebola, shingella, listeria, yersinia, West Nile virus, protozoa, fungi, *Salmonella enterica, Candida albicans, Trichophyton mentagrophytes,* poliovirus, *Enterobacter aerogenes, Salmonella typhi, Klebsiella pneumonia, Aspergillus brasiliensis,* and methicillin resistant *Staphylococcus aureus* (MRSA), or any combination thereof.

One objective of the presented materials can be to facilitate certain reactions or interactions at the interface or beyond the interface. An objective can also be to recruit certain biologicals or chemicals to the interface.

Certain exemplary embodiments will now be described to provide an overall understanding of the principles of the structure, function, manufacture, and use of the devices and methods presented herein. One or more examples of these embodiments are illustrated in the accompanying drawings. Those skilled in the art will understand that the materials, devices and methods specifically described herein and illustrated in the accompanying drawings are non-limiting exemplary embodiments and that the scope of the present disclosure is defined solely by the claims. The features illustrated or described in connection with one exemplary embodiment may be combined with the features of other embodiments. Such modifications and variations are intended to be included within the scope of the present disclosure.

All publications, patents and patent applications cited herein, whether supra or infra, are hereby incorporated by reference in their entirety. As used in this specification and the appended claims, the singular forms "a," "an," and "the" include plural references unless the content clearly dictates otherwise. The terms used in this invention adhere to standard definitions generally accepted by those having ordinary skill in the art. In case any further explanation might be needed, some terms have been further elucidated below.

The present disclosure provides structures of surfactant molecules. In some embodiments, components of the surfactant molecules can be fluorophilic hence, soluble in fluorous oils, or oleophilic hence, soluble in oils. Other fragments of the same surfactant molecules can be hydrophilic hence, soluble in aqueous solutions. Fragments of the surfactant molecules can be attracted to certain solid surfaces. The aforementioned fragments or other fragments of the surfactant molecules can be chemically active, biologically active, or chemically and biologically active.

The present disclosure also provides synthetic procedures of the presented active surfactant molecules. Such procedures describe the attachment of groups of atoms that have the function of anchoring the final surfactant molecules at the intended phases and of groups of atoms that have the function of interacting with chemical or biological or both chemical and biological moieties.

Examples of fluorophilic fragments include, but are not limited to, linear, branched, cyclic, saturated or unsaturated hydrocarbons that are partially or fully fluorinated. When the hydrocarbons are partially fluorinated, 1 to 99 percent of the hydrogen atoms on the carbon atoms are replaced with fluorine atoms. When the hydrocarbons are fully fluorinated (perfluorinated), 100 percent of the hydrogen atoms on the carbon atoms are replaced with fluorine atoms. The fluorophilic component can optionally include at least one heteroatom.

Examples of fluorophilic fragments include, but are not limited to, partially or fully fluorinated ethers and their polymers, partially or fully fluorinated ethylenimine and their polymers, partially or fully fluorinated thioethers and their polymers, partially or fully fluorinated silylethers and their polymers and derivatives, and any combination thereof.

Examples of biologically active fragments include, but are not limited to, antibodies, antibody receptors, proteins, protein receptors, amino-acids, amino-acid receptors, cellular receptors, microorganism receptors, biotin, streptavidin, avidin, fluoresceine, rhodamine, folic acid, enzymes, biocatalysts, maleimides, lipids, glycolipids, rhamnolipids, cholesterol, oleioic acid, vitamin, 1,2-distearoyl-sn-glycero-3-phosphoethanolamine, labels of fusion proteins, 6-chlorohexane derivatives, HALO (haloalkane dehalogenase) tag, benzylguanine derivatives, SNAP ($O^6$-alkylguanine-DNA-alkyltransferase) tag, benzylcytosine derivatives, CLIP ($O^2$-alkylcytosine-DNA-alkyltransferase) tag, ACP (acyl carrier protein) tag labeling, MCP (mutated acyl carrier protein) tag labeling, heparin, chitosan, lactose (natural and synthetic), sialyllactose, mono- and poly-saccharides, and derivatives and combinations thereof.

Examples of chemically active fragments include, but are not limited to, catalysts, such as transition metals, transition metal complexes, covalent and non-covalent organocatalysis.

In some embodiments, the attachment of the fluorophilic component to the fluorophobic component is a chemical transformation such as a substitution reaction where one functional group is replaced with another. For example, a material comprising an amine group can react with an acid to form an amide linkage. In another example, a material comprising a halide can react with a hydroxyl-containing fragment to form an ether linkage.

In some embodiments, the surfactant molecules can be dissolved in a fluorous phase, which in turn is mixed with a non-fluorous phase. The two phase are mixed to form an emulsion where the surfactant molecules populate the interface of the two phases.

In some embodiments, the surfactant molecules can be dissolved in a fluorous phase, which in turn is mixed with a non-fluorous phase in a microfluidic device. The flow of the two phases is controlled in order to generate non-fluorous droplets in a continuous flow of the fluorous phase. The size distribution of the generated droplets can be highly homogeneous.

In some embodiments, the surfactant molecules can be dissolved in a non-fluorous phase. The resulting non-fluorous phase is mixed with the fluorous phase and then emulsions and droplets are generated following the aforementioned procedures.

In some embodiments, the surfactant molecules can be dissolved in a fluid. The resulting fluid is then allowed to flow on a solid surface, including mixing with beads and resins, permitting the deposition of the surfactant molecules on the solid surfaces.

In some embodiments, the surfactant molecules can be dissolved in a fluid phase. The resulting fluid phase is then allowed to flow on a solid surface, including mixing with beads and resins. The fluid is then removed by distillation or evaporation, permitting the deposition of the surfactant molecules on the solid surfaces.

In order that the subject matter disclosed herein may be more efficiently understood, examples are provided below. It should be understood that these examples are for illustrative purposes only and are not to be construed as limiting the claimed subject matter in any manner. Throughout these examples, molecular cloning reactions, and other standard recombinant DNA techniques, were carried out according to methods described in Maniatis et al., Molecular Cloning—A Laboratory Manual, 2nd ed., Cold Spring Harbor Press (1989), using commercially available reagents, except where otherwise noted.

EXAMPLES

Example 1

Synthesis of [perfluoropolyether]-[poly(ethylene glycol)]-biotin

As an example of the experimental work, the synthesis of [perfluoropolyether]-[poly(ethylene glycol)]-biotin followed these steps: A 100 mL one neck round bottom flask was fitted with a magnetic stirrer bar and a rubber stopper. 0.05 milli-mole biotin-[poly(ethylene glycol) amine was added under positive pressure of inert gas, followed by the addition of 5 mL anhydrous THF and 0.075 milli-mole $NEt_3$ (triethyl amine). At the end of reagents' addition, 5 mL fluorous phase of 0.05 milli-mole oxalyl chloride of perfluoropolyether was added. The addition of fluorous phase transformed the colorless solution into a white emulsion. The final white emulsion was allowed to stir at room temperature overnight. On the following day, all volatile reagents and solvents were removed under vacuum The milky white solution was then filtered through a fritted glass filter. The filtrate was evacuated on the rotary evaporator to yield oily product.

Example 2

Synthesis of [perfluoropolyether]-[poly(ethylene glycol)]-biotin

As an example of the experimental work of the synthesis of [perfluoropolyether]-[poly(ethylene glycol)]-biotin followed these steps: A 100 mL one neck round bottom flask was fitted with a magnetic stirrer bar and a rubber stopper. 0.05 milli-mole biotin-[poly(ethylene glycol) bromide was added under positive pressure of inert gas, followed by the addition of 5 mL anhydrous THF. At the end of reagents' addition, 5 mL fluorous phase of 0.05 milli-mole Lithium oxide of perfluoropolyether was added. The addition of fluorous phase transformed the colorless solution into a white emulsion. The final white emulsion was allowed to stir at room temperature overnight. On the following day, all volatile reagents and solvents were removed under vacuum. The milky white solution was then filtered through a fritted glass filter. The filtrate was evacuated on the rotary evaporator to yield oily product.

Example 3

Synthesis of perfluoropolyether-lactose

As an example of the experimental work, the synthesis of perfluoropolyether-lactose followed these steps: A 100 mL one neck round bottom flask was fitted with a magnetic stirrer bar and a rubber stopper. 0.058 milli-mole lactose amine derivative was added under positive pressure of inert gas, followed by the addition of 5 mL anhydrous THF and 0.087 milli-mole NEt$_3$. At the end of reagents' addition, 5 mL fluorous phase of 0.058 milli-mole oxalyl chloride of perfluoropolyether was added. The addition of fluorous phase transformed the colorless solution into a white emulsion. The final white emulsion was allowed to stir at room temperature overnight. On the following day, all volatile reagents and solvents were removed under vacuum. The milky white solution was then filtered through a fritted glass filter. The filtrate was evacuated on the rotary evaporator to yield clear oil.

Example 4

Synthesis of [perfluoropolyether]-[poly(ethylene glycol)]-fluorescein

As an example of the experimental work, the synthesis of [perfluoropolyether]-[poly(ethylene glycol)]-fluorescein followed these steps: A 100 mL one neck round bottom flask was fitted with a magnetic stirrer bar and a rubber stopper. 0.05 milli-mole fluoresceinamine was added under positive pressure of inert gas, followed by the addition of 5 mL anhydrous THF and 0.075 milli-mole NEt$_3$. At the end of reagents' addition, 5 mL fluorous phase of 0.05 milli-mole oxalyl chloride of perfluoropolyether was added. The addition of fluorous phase transformed the colorless solution into a white emulsion. The rubber stopper was then replaced with a glass flow control adapter and the final white emulsion was allowed to stir at room temperature overnight. On the following day, all volatile reagents and solvents were removed under vacuum. The milky white solution was then filtered through a fritted glass filter. The filtrate was evacuated on the rotary evaporator to yield oily product.

Example 5

Synthesis of [perfluoropolyether]-[poly(ethylene glycol)]-fluorescein

As yet another example of the experimental work for the synthesis of [perfluoropolyether]-[poly(ethylene glycol)]-fluorescein followed these steps: A 100 mL one neck round bottom flask was fitted with a magnetic stirrer bar and a rubber stopper. 0.05 milli-mole fluorescein chloride was added under positive pressure of inert gas, followed by the addition of 5 mL anhydrous THF. At the end of reagents' addition, 5 mL fluorous phase of 0.05 milli-mole Lithium oxide of perfluoropolyether was added. The addition of fluorous phase transformed the colorless solution into a white emulsion. The final white emulsion was allowed to stir at room temperature overnight. On the following day, all volatile reagents and solvents were removed under vacuum. The milky white solution was then filtered through a fritted glass filter. The filtrate was evacuated on the rotary evaporator to yield oily product.

Example 6

Synthesis of [perfluoropolyether]-[poly(ethylene glycol)]-streptavidin

As yet another example of the experimental work, the synthesis of [perfluoropolyether]-[poly(ethylene glycol)]-streptavidin followed these steps: A 100 mL one neck round bottom flask was fitted with a magnetic stirrer bar and a rubber stopper. 0.05 milli-mole streptavidin amine was added under positive pressure of inert gas, followed by the addition of 5 mL anhydrous THF and 0.075 milli-mole NEt$_3$. At the end of reagents' addition, 5 mL fluorous phase of 0.05 milli-mole oxalyl chloride of perfluoropolyether was added. The addition of fluorous phase transformed the colorless solution into a white emulsion. The rubber stopper was then replaced with a glass flow control adapter and the final white emulsion was allowed to stir at room temperature overnight. On the following day, all volatile reagents and solvents were removed under vacuum. The milky white solution was then filtered through a fritted glass filter. The filtrate was evacuated on the rotary evaporator to yield oily product.

Example 7

Synthesis of [perfluoropolyether]-[poly(ethylene glycol)]-benzylguanine

As an example of the experimental work, the synthesis of [perfluoropolyether]-[poly(ethylene glycol)]-benzylguanine followed these steps: A 100 mL one neck round bottom flask was fitted with a magnetic stirrer bar and a rubber stopper. 0.05 milli-mole benzylguanine-[poly(ethylene glycol) amine was added under positive pressure of inert gas, followed by the addition of 5 mL anhydrous THF and 0.075 milli-mole NEt$_3$. At the end of reagents' addition, 5 mL fluorous phase of 0.05 milli-mole oxalyl chloride of perfluoropolyether was added. The addition of fluorous phase transformed the colorless solution into a white emulsion. The final white emulsion was allowed to stir at room temperature overnight. On the following day, all volatile reagents and solvents were removed under vacuum. The milky white solution was then filtered through a fritted glass filter. The filtrate was evacuated on the rotary evaporator to yield oily product.

Example 8

Synthesis of [perfluoropolyether]-[poly(ethylene glycol)]-benzylguanine

As an example of the experimental work of the synthesis of [perfluoropolyether]-[poly(ethylene glycol)]-benzylguanine followed these steps: A 100 mL one neck round bottom flask was fitted with a magnetic stirrer bar and a rubber stopper. 0.05 milli-mole benzylguanine-[poly(ethylene glycol) bromide was added under positive pressure of inert gas, followed by the addition of 5 mL anhydrous THF. At the end of reagents' addition, 5 mL fluorous phase of 0.05 milli-mole Lithium oxide of perfluoropolyether was added. The addition of fluorous phase transformed the colorless solution into a white emulsion. The final white emulsion was allowed to stir at room temperature overnight. On the following day, all volatile reagents and solvents were removed under vacuum. The milky white solution was then filtered through a fritted glass filter. The filtrate was evacuated on the rotary evaporator to yield oily product.

Example 9

Synthesis of [perfluoropolyether]-[poly(ethylene glycol)]-chlorohexane

As an example of the experimental work, the synthesis of [perfluoropolyether]-[poly(ethylene glycol)]-chlorohexane followed these steps: A 100 mL one neck round bottom flask was fitted with a magnetic stirrer bar and a rubber stopper. 0.05 milli-mole 6-chlorohexane-[poly(ethylene glycol)

amine was added under positive pressure of inert gas, followed by the addition of 5 mL anhydrous THF and 0.075 milli-mole NEt$_3$. At the end of reagents' addition, 5 mL fluorous phase of 0.05 milli-mole oxalyl chloride of perfluoropolyether was added. The addition of fluorous phase transformed the colorless solution into a white emulsion. The final white emulsion was allowed to stir at room temperature overnight. On the following day, all volatile reagents and solvents were removed under vacuum. The milky white solution was then filtered through a fritted glass filter. The filtrate was evacuated on the rotary evaporator to yield oily product.

Example 10

Synthesis of [perfluoropolyether]-[poly(ethylene glycol)]-chlorohexane

As an example of the experimental work of the synthesis of [perfluoropolyether]-[poly(ethylene glycol)]-chlorohexane followed these steps: A 100 mL one neck round bottom flask was fitted with a magnetic stirrer bar and a rubber stopper. 0.05 milli-mole 6-chlorohexane-[poly(ethylene glycol) bromide was added under positive pressure of inert gas, followed by the addition of 5 mL anhydrous THF. At the end of reagents' addition, 5 mL fluorous phase of 0.05 milli-mole Lithium oxide of perfluoropolyether was added. The addition of fluorous phase transformed the colorless solution into a white emulsion. The final white emulsion was allowed to stir at room temperature overnight. On the following day, all volatile reagents and solvents were removed under vacuum. The milky white solution was then filtered through a fritted glass filter. The filtrate was evacuated on the rotary evaporator to yield oily product.

Various modifications of the described subject matter, in addition to those described herein, will be apparent to those skilled in the art from the foregoing description. Such modifications are also intended to fall within the scope of the appended claims.

What is claimed is:

1. A surfactant molecule comprising:
   a biologically active fragment soluble in a non-fluorous phase; and
   a fluorophilic component comprising a polymeric fluorinated fragment soluble in a fluorous phase and chemically bound to said biologically active fragment via a polymeric group to form said surfactant molecule, wherein the polymeric fluorinated fragment includes fluorinated repeat units comprising at least one heteroatom, and
   wherein said biologically active fragment facilitates at least one reaction in which at least one molecule in the non-fluorous phase can participate, wherein said polymeric group is poly(ethylene glycol), and wherein said polymeric group facilitates stabilization of said surfactant molecule in the non-fluorous phase, and wherein said at least one reaction is an association reaction, a dissociation reaction, a labeling reaction, a catalytic reaction, or any combinations thereof.

2. The surfactant molecule of claim 1, wherein the polymeric fluorinated fragment is a fluorinated polyether, a fluorinated polyethylenimine, a fluorinated polythioether, a fluorinated polysilylether, any derivatives thereof, or any combinations thereof.

3. The surfactant molecule of claim 2, where the biologically active fragment is an antibody, antibody receptor, protein, protein receptor, amino-acid, amino-acid receptor, cellular receptor, microorganism receptor, biotin, streptavidin, avidin, fluoresceine, rhodamine, folic acid, an enzyme, bio-catalyst, maleimide, lipid, glycolipid, rhamnolipid, cholesterol, oleioic acid, vitamin, 1,2-distearoyl-sn-glycero-3-phosphoethanolamine, label of fusion protein, a 6- chlorohexane derivatives, protein tag haloalkane dehalogenase tag, a benzylguanine derivative, $O^6$-alkylguanine-DNA-alkyltransferase tag, a benzylcytosine derivative, $O^2$-alkylcytosine-DNA-alkyltransferase tag, acyl carrier protein tag labeling, mutated acyl carrier protein tag labeling, heparin, chitosan, lactose (natural and synthetic), sialyllactose, a mono- and poly-saccharide, any derivatives thereof, or any combinations thereof.

4. A method of stabilizing an interface between a fluorophilic phase and a non-fluorophilic phase and/or providing suitable active sites for facilitating biological activities within the fluorophilic phase and the non-fluorophilic phase comprising:
   using one or more surfactant molecules of any one of claims 1, 2, and 3.

5. The method of claim 4, wherein the fluorophilic phase and/or the non-fluorophilic phase comprise a plurality of biological entities, wherein the surfactant molecules interact with the biological entities.

6. The method of claim 5, wherein the interaction between the surfactant molecules and the biological entities is chemical or physical.

7. The method of claim 6, wherein the interaction between the surfactant molecules and the biological entities is a catalysis.

8. The method of claim 7, wherein the interaction between the surfactant molecules and the biological entities is an association reaction, a dissociation reaction, or a combination thereof.

9. The mended of claim 8, wherein the interaction is for qualification purposes, or labeling purposes, or a combination thereof.

10. The method of claims 8, wherein the interaction is for quantification purposes.

11. The method of claim 8, wherein the interaction is for transport purposes.

12. The surfactant molecule of claim 1, wherein the fluorous phase is selected from the group consisting of 3-ethoxy-dodecafluoro-2-trifluoromethyl-hexane, triperfluorobutylamine, perfluoromethyldiperfluorobutylamine, ethyl nonafluoroisobutyl ether, ethyl nonafluorobutyl ether, methyl nonafluorobutyl ether, perfluorinated oils, or any combinations thereof.

13. The surfactant molecule of claim 1, wherein said at least one molecule is a chemically active molecule, a biologically active molecule, or a combination thereof.

14. The surfactant molecule of claim 1, wherein said polymeric group is chemically bound to said biologically active fragment and said fluorophilic component via an amide linkage group or an ether linkage group.

15. The surfactant molecule of claim 2, wherein 1 to 99 percent of the hydrogen atoms on the carbon atoms of the fluorinated fragments are replaced with fluorine atoms.

16. The surfactant molecule of claim 2, wherein 100 percent of the hydrogen atoms on the carbon atoms of the fluorinated fragments are replaced with fluorine atoms.

17. The surfactant molecule of claim 2, wherein said polymeric fluorinated fragment is a fluorinated polyether.

18. The surfactant molecule of claim 17, wherein said fluorinated polyether is a perfluoropolyether.

19. A composition comprising:
a surfactant molecule comprising:
- a biologically active fragment soluble in a non-fluorous phase; and
- a fluorophilic component comprising a polymeric fluorinated fragment soluble in a fluorous phase and chemically bound to said biologically active fragment via a polymeric group to form said surfactant molecule, wherein the polymeric fluorinated fragment includes fluorinated repeat units comprising at least one heteroatom, and
- wherein said biologically active fragment facilitates at least one reaction in which at least one molecule in the non-fluorous phase can participate, wherein said polymeric group is poly(ethylene glycol), and wherein said polymeric group facilitates stabilization of said surfactant molecule in the non-fluorous phase, and wherein said at least one reaction is an association reaction, a dissociation reaction, a labeling reaction, a catalytic reaction, or any combinations thereof.

20. The composition of claim 19, further comprising a fluorous phase that is selected from the group consisting of 3-ethoxy-dodecafluoro-2-trifluoromethyl-hexane, triperfluorobutylamine, perfluoromethyldiperfluorobutylamine, ethyl nonafluoroisobutyl ether, ethyl nonafluorobutyl ether, methyl nonafluorobutyl ether, perfluorinated oils, or any combinations thereof.

21. The composition of claim 19, wherein said polymeric group is chemically bound to said biologically active fragment via an ether linkage group or an amide linkage group.

22. The surfactant molecule of claim 1, wherein said at least one reaction is an association reaction, a dissociation reaction, a catalytic reaction, or any combinations thereof.

23. A droplet stabilized by the surfactant molecule of claim 1, wherein said biologically active fragment facilitates at least one reaction in which at least one molecule in the non-fluorous phase can participate within the droplet.

* * * * *

UNITED STATES PATENT AND TRADEMARK OFFICE
CERTIFICATE OF CORRECTION

| | |
|---|---|
| PATENT NO. | : 11,505,648 B2 |
| APPLICATION NO. | : 15/567232 |
| DATED | : November 22, 2022 |
| INVENTOR(S) | : Roger A. Nassar |

It is certified that error appears in the above-identified patent and that said Letters Patent is hereby corrected as shown below:

In the Specification

At Column 1, immediately after the title and before the first paragraph, please insert the following section:
--This application claims priority to PCT/US2016/028399, filed on April 20, 2016 pursuant to U.S.C. § 371, which in turn claims priority to U.S. Provisional Application No. 62/150,409, filed on April 21, 2015, both of which are hereby incorporated by reference in their entirety.--

Signed and Sealed this
Fifth Day of September, 2023

Katherine Kelly Vidal
*Director of the United States Patent and Trademark Office*